United States Patent [19]

Skoien

[11] Patent Number: 5,670,220
[45] Date of Patent: Sep. 23, 1997

[54] INSULATION BATTS

[76] Inventor: Ralph Warwick Skoien, 53 Grove Road, Rosanna, Victoria 3084, Australia

[21] Appl. No.: 221,631

[22] Filed: Mar. 9, 1994

Related U.S. Application Data

[63] Continuation of PCT/AU92/00455 filed Aug. 31, 1992.

[30] Foreign Application Priority Data

Sep. 10, 1991 [AU] Australia ................... PK8277

[51] Int. Cl.⁶ ...................................... E04B 1/80
[52] U.S. Cl. .................. 428/12; 428/101; 428/119; 428/188; 428/457; 428/912.2; 428/189; 428/223; 229/120.31
[58] Field of Search ................ 428/12, 101, 119, 428/188, 457, 912.2, 189, 223; 229/120.31

[56] References Cited

U.S. PATENT DOCUMENTS

| | | | |
|---|---|---|---|
| 4,315,962 | 2/1982 | Skoien | 428/12 |
| 4,700,521 | 10/1987 | Cover | 52/404 |
| 4,808,457 | 2/1989 | Kruck et al. | 428/69 |
| 5,030,518 | 7/1991 | Keller | 428/550 |

FOREIGN PATENT DOCUMENTS

| | | |
|---|---|---|
| 112514 | 2/1941 | Australia. |
| 15584/76 | 1/1978 | Australia. |
| 80566/82 | 8/1982 | Australia. |
| 863647 | 2/1978 | Belgium. |
| 567517 | 10/1929 | France. |
| 508731 | 9/1930 | Germany. |
| 459574 | 2/1937 | United Kingdom. |

*Primary Examiner*—William Watkins
*Attorney, Agent, or Firm*—Oliff & Berridge

[57] ABSTRACT

An insulating batt having two sheets of heat reflective insulating material and connecting means between and connecting sheets together in an overlapping substantially parallel relationship. The connecting means includes a plurality of bracing strips extending between and connected to each of sheets. The bracing strips enable the batt to be adjusted between a collapsed position in which the sheets are closely adjacent, and an operative position in which sheets are mutually spaced. Each bracing strip has two substantially parallel longitudinal fold lines that a bracing web is defined between lines and a respective side margin extends from the web beyond each line. The respective margin of each bracing strip is secured to each of sheets such that the bracing strip web is substantially normal to and defines the spacing between the sheets when batt is in its operative position and such that, moving the batt to its collapsed position, the webs are substantially parallel to sheets. Each of a plurality of partition strips extend longitudinally between the webs of bracing strips. Each partition strip is folded along two substantially parallel fold lines such that a central partition web is defined between the lines and a respective side flange extends from the web beyond each of its lines. Each bracing strip has a respective flange secured to each of webs of successive bracing strips, with the width of each web substantially corresponding to the spacing between its bracing strips when the batt is in its operative position.

21 Claims, 6 Drawing Sheets

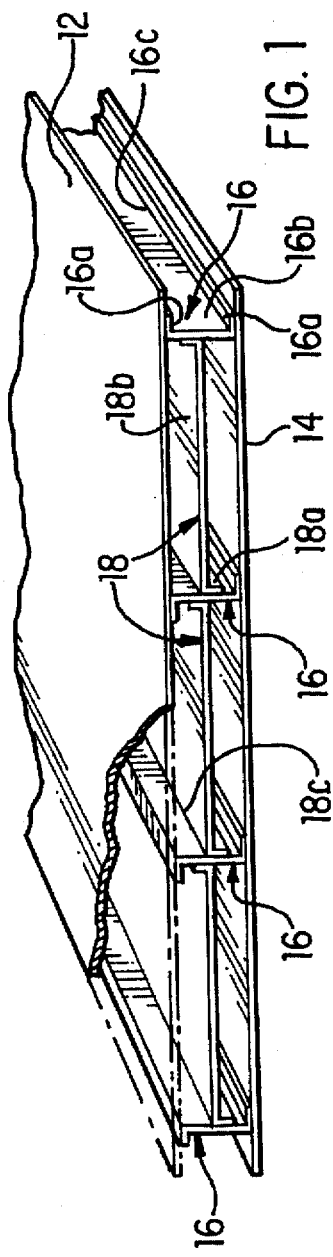
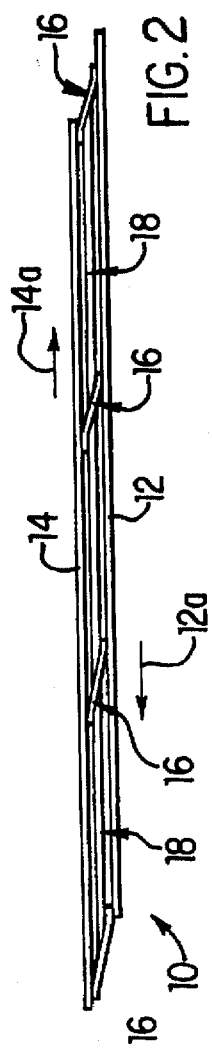
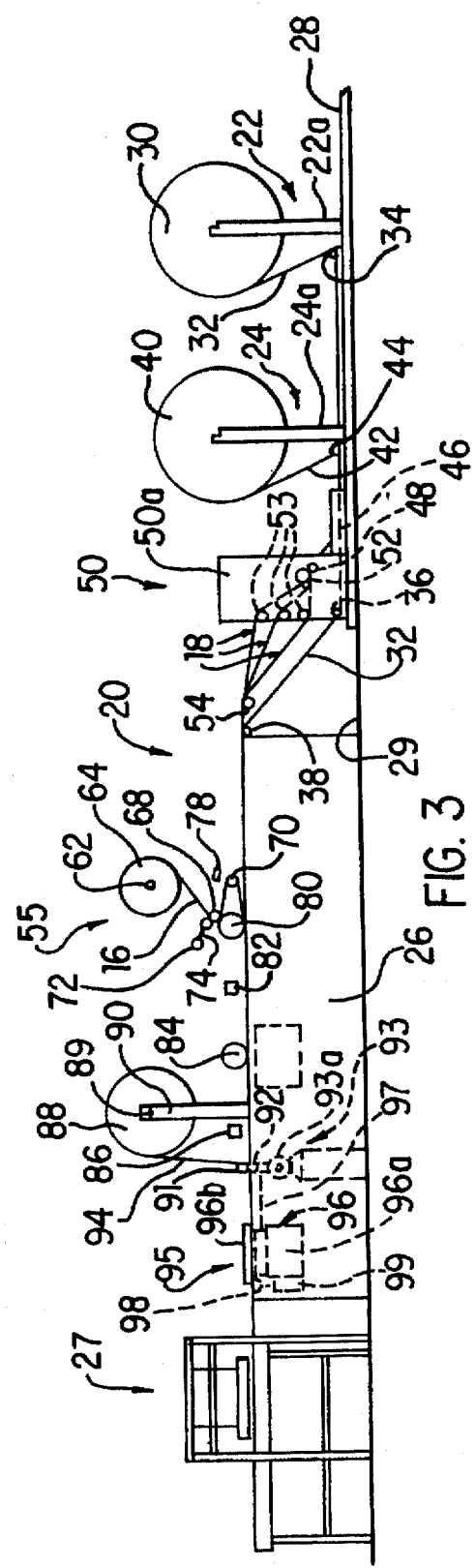

INSULATION BATTS

This application is a continuation of PCT/AU/00455 filed Aug. 31, 1992, which claims priority from Australian Application PK8277 filed Sep. 10, 1991.

BACKGROUND OF THE INVENTION

1. Field of the Invention

This invention relates to apparatus for producing reflective insulating batts.

2. Description of the Related Art

The general type of insulating batt with which this invention is concerned is shown, in one form, in FIGS. 1 and 2. The batt illustrated in FIGS. 1 and 2 has a series of partition strips substantially parallel to top and bottom panels, with each of those strips extending between successive connector strips. However, in other forms of batt of that type, two or more such series can be provided such that there are two or more partition strips between successive connector strips.

The batt shown in FIGS. 1 and 2 is the subject of my co-pending application U.S. patent application Ser. No. 08/198,033, now abandoned and the disclosure of said co-pending application is incorporated herein by reference. The batt disclosed in said co-pending application is an improvement over a known form of batt disclosed in my Australian patent specification 511833.

SUMMARY OF THE INVENTION

According to the invention, there is provided apparatus for use in producing reflective insulating batts, comprising:

(a) an elongate processing bed along which a horizontally disposed first length of reflective insulation (hereinafter referred to as a "base layer") is able to be drawn longitudinally from a supply end, to a discharge end, of the bed;

(b) drive means for longitudinally drawing the base layer along the bed from the supply end to the discharge end:

(c) first supply means for supplying onto and along the bed, over the base layer, at least one horizontally disposed first set of strips of sheet material;

(d) second supply means for supplying onto and along the bed, over the base layer, a horizontally disposed second set of strips of sheet material; and (e) third supply means for supplying a second length of reflective insulation (hereinafter referred to as a "top layer") over the base layer such that all strips of each set are located between said base layer and said top layer; wherein the first supply means is operable to present the strips of the first set onto the base layer in a laterally adjacent array; and wherein the second supply means is operable to present the strips of the second set in a lateral array in which the strips of each set are laterally inter-leaved in an arrangement in which each strip of one set (hereinafter referred to as "connector strips") has one of opposed side margins thereof in contact with the base layer and its other said side margin exposed for contact with the top layer when the latter is supplied, and in which each strip of the other set (hereinafter referred to as "partition strips") has each of opposed side margins thereof in contact with a respective connector strip along a line intermediate the side margins of the respective connector strip.

The invention also provides a method of producing reflective insulating batts, comprising the steps of:

(a) longitudinally drawing a first length of reflective insulating material (hereinafter referred to as a "base layer") along a horizontally extending path of travel in which the base layer is horizontally disposed;

(b) supplying onto and along the base layer at least one horizontally disposed set of first strips such that the strips of the first set are drawn with the base layer in a laterally adjacent array thereon;

(c) supplying onto the base layer a horizontally disposed set of second strips such that the strips of the second set are drawn with the base layer;

wherein the strips of one set are laterally inter-leaved with the strips of the other set in an arrangement in which:

each of the strips of one set (hereinafter referred to as "connector strips"), at a side thereof nearer to the first side of the base layer, defines a first side margin which remains uncovered;

each connector strip, at a side thereof nearer to the second side of the base layer, defines a second side margin which is in contact with the base layer; and each connector strip defines a web portion between its first and second side margins and each of the strips of the other set (hereinafter referred to as "partition strips") defines respective side margins to each side of a web portion thereof, with each partition strip having each of its side margins in contact with a respective web portion of successive connector strips;

(d) supplying onto and along the base layer, at a location downstream from that at which the inter-leaved arrangement is provided, a second length of reflective insulation (hereinafter referred to as a "top layer") such that the top layer is in contact with the first side margins of the connector strips and is drawn with the base layer, in an assembly with the base layer and the inter-leaved arrangement on the base layer; and (e) cutting said assembly transversely of said path, into required lengths to comprise insulating batts;

wherein, in at least one stage along said path of travel, pressure is applied to facilitate adhesive bonding along glue lines extending longitudinally of the assembly:

between the second side margin of each connector strip and the base layer;

between each first side margin of each connector strips and the top layer; and for each partition strip, between each of its side margins and the respective web portions of its successive connector strips;

such that each batt is able to be adjusted from a collapsed condition in which it is produced, to an operative position in which the base layer and the top layer are mutually spaced by the web portion of each connector strip, and in which the web portions of each partition strip is spaced from the base and top layer, with such adjustment being enabled by bending of each connector and partition strip at a respective fold line between its web and each of its side margins.

In the apparatus according to the invention, the base layer may be drawn along the bed from a supply roll thereof located beyond the supply end. The drive means draws the base layer along the bed, and preferably comprises a roll stand through which the base layer is fed and having at least one driven roll. Most preferably, the assembly, of the base and top layers and the partition and connector strips therebetween, passes through a pair of rolls of the roll stand, to provide the drawing action. In one arrangement, an upper one of the pair of rolls acts to draw the top layer onto the base layer. However, the roll stand comprising the drive means can be downstream from a location at which the third supply means supplies the top layer onto the base layer, such as between that location and that at which the assembly is cut into lengths to comprise batts.

For ease of description it will be assumed, unless indicated to the contrary, that there is only one set of partition strips. The partition strips are narrow relative to the width of the base layer. The first supply means preferably is operable to present the partition strips onto the base layer such that not only do the partition strips overlap each other over a minor portion of their width, but also such that the partition strips as a set are slightly offset to a first side of the base layer to expose an upper surface of the latter along the second side thereof. The partition strips preferably are of substantially the same width, while the aggregate of their widths may correspond substantially to the width of the base layer.

The partition strips may each be drawn from a respective roll. However, they may be derived from a single roll of sheet material, with the sheet being drawn from that roll and slit longitudinally by slitting means of the first supply means. The slitting means can take a variety of forms. One convenient form comprises a plurality of annular slitter blades spaced along a common axis disposed across a path along which the sheet material is drawn from the single roll, and operable to slit the sheaf to provide the partition strips.

Where the partition strips are drawn from respective rolls, they may be drawn therefrom so as to achieve the required overlapping disposition on the base layer. However, with respective rolls or partition strips derived from a single roll, the first supply means may include guide means operable to present the partition strips in such disposition. A variety of guide means can be used, and it may comprise guide bars, baffles, plates or rollers for achieving relative lateral movement between the partition strips.

The connector strips also are narrow relative to the width of the base layer. While their number can vary as detailed herein, there usually will be (n+1) connector strips, where "n" is the number of partition strips. The aggregate of the widths of the connector strips does not necessarily correspond to the width of the base layer.

The supply means for the connector strips is operable to laterally interpose or inter-leave the connector strips with the partition strips. Relative to the above reference to first and second edges of the base layer, and applying a corresponding designation to the partition and connector strips, the interposing of the connector strips is such that each connector strip has its second edge in contact with the base layer, and its first edge overlapping the second edge of a partition strip, and such that each partition strip has its first edge partially overlapping a connector strip.

The first supply means most preferably is operable at a first station to provide the partition strips onto the base layer, as the drive means draws the base layer and the partition strips thereon to a second station at which the second supply means is operable to provide the connector strips thereon. In such case, the apparatus preferably includes lifting means, such as a respective lifting finger for each partition strip, for turning up the first edge of each partition strip to enable interposing of a respective connector strip. Guide means for each partition strip preferably is provided adjacent its second edge, so as to prevent its lateral displacement relative to the base layer, under the action of such lifting means.

The converse arrangement is possible, in which the connector strips are presented to the bed before the partition strips. However, this is less desirable; as it complicates required adhesive bonding of the strips. Also, the converse arrangement also can necessitate use of first lifting means to turn up the first edge of each connector strip and, thereafter, second lifting means to turn up the first edge of each partition strip. However, the overall requirements for this alternative arrangement will be apparent from the overall description provided herein.

Associated with the second supply means, there may be provided first glue applicator means for applying at least one glue line along the surface of each connector strip to be presented to face towards the base layer. There preferably is a respective glue applicator head for each connector strip. The arrangement is such that a first glue line is applied along that surface, adjacent the second edge of each connector strip, such that on interposing the connector strips, each is bonded to the base layer. Most preferably a second glue line is simultaneously applied along that surface, intermediate the edges of each connector strip which is to overlap a partition strip, such that on interposing the connector strips, each is bonded to the partition strip it overlaps along the second edge of the latter.

Downstream of the second station, that is, beyond that station in the direction in which the driving means draws the base layer, the apparatus may have a third station, for facilitating bonding. At the third station, there is a respective roller under which each connector strip passes to urge it into intimate contact, along the glue lines, with the base layer and the second edge of the respective partition strip.

Further downstream from the third station, the apparatus may have a fourth station, having second glue applicator means. The second glue applicator means is operable to apply a third glue line along the uppermost surface of each connector strip, other than the connector strip adjacent to the second edge of the base layer. Each third glue line may be applied by a respective applicator head, and is positioned intermediate the edges of its connector strip.

At a fifth station, downstream of the fourth station, the apparatus may have roller means operable to press down the upturned edge of each partition strip. The overall arrangement is such that the first edge of each partition strip is pressed onto a respective third glue line, to achieve bonding between that edge and the respective connector strip.

At a sixth station, downstream of the fifth, the apparatus may have a third glue applicator means, which may comprise a separate applicator head for providing a fourth glue line for each connector strip. Each fourth glue line is to provide bonding between the first edge of each connector strip and a second length of reflective insulation (hereinafter "the top layer"). The fourth glue lines preferably are applied to the uppermost surface of each connector strip, as this facilitates them being applied accurately. However, the fourth glue lines can correspondingly be applied along the top layer, at the corresponding laterally spacing.

At a seventh station, the apparatus may include roller means through which an assembly, comprising the base layer and the partition and connector strips thereon, is passed. The top layer also is drawn through the roller means at the seventh station, so as to be applied onto the assembly and achieve bonding between the connector strips and the top layer. The top layer preferably is of substantially the same width as the base layer. The top layer may be drawn from a supply roll of insulating material, and it most preferably is laterally offset to the first edge of the base layer such that the outermost connector strips are bonded along a respective edge of the top layer.

From the seventh station, the assembly with the top layer bonded thereto preferably passes to a cutting station. At the cutting station, cutting means may be operable to cut batts of a required length, with these being received at a collection station.

The foregoing description primarily is directed to the production of batts which, in their in use condition, are usually inverted and have upper and lower sheets (respectively of the base and former top layers) spaced by the connector strips, with the partition strips spaced from the upper and lower sheets and extending between successive connector strips. That is, description principally has been with reference to only one set of partition strips. However, the batt can have at least one further set of partition strips extending between the successive connector strips. In such case, the first supply means is operable to provide the at least one further set of partition strips, with the or each further set successively disposed on the first set and each laterally offset to the first side of the base layer by a corresponding amount, relative to the set of connector strips on which it is disposed. Lifting of each first edge of a partition strip thus requires simultaneous lifting of a group comprising a respective partition strip of each set. Interposing of connector strips also requires that each is interposed between the strips of one group and those of another group of partition strips.

With only one set of "n" partition strips, there preferably is (n+1) connector strips. With two or more sets of "n" partition strips, there again preferably is (n+1) connector strips. However, in each case, it is not imperative that at least one partition strip is provided between each pair of successive connector strips. That is, the or a set of partition strips, for a batt having (n+1) connector strips, could if required have less than "n" partition strips. However, it normally is appropriate to have "n" partition strips in the or each set, and (n+1) connector strips. Typically, "n" is from 2 to 5.

In the description above, the invention is described with reference to adhesive bonding by glue lines applied as the base layer is drawn by the drive means. In that form of the invention, the glue preferably is applied hot, from heated glue applicator heads and rapidly sets after being pressed by roll means and cooled. However, alternative arrangements are possible, in which the glue lines are applied in advance, to at least one of the surfaces to be bonded, with the glue being a pressure and heat, or simply a pressure activatable glue. In a still further alternative, the glue lines may be so pre-applied and be defined by contact adhesive strips which, until needing to be exposed for bonding, are covered by covering stripes which are peeled off as required.

BRIEF DESCRIPTION OF THE DRAWINGS

In order that the present invention can be more readily understood, description now is directed to the accompanying drawings, in which:

FIG. 1 shows one form of batt produced by the apparatus of the present invention in its in use condition, after being inverted end for end from its as formed condition;

FIG. 2 shows the batt of FIG. 1, inverted end for end, in its as formed condition;

FIG. 3 is a schematic representation of apparatus according to the present invention;

DESCRIPTION OF THE PREFERRED EMBODIMENTS

Figure 4:
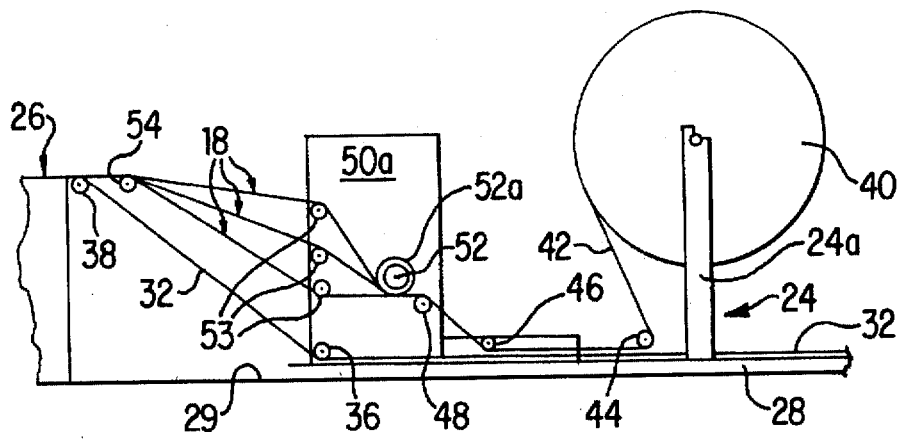
FIG. 4 shows, in enlarged detail, part of the right hand end of the apparatus of FIG. 3.
Figure 6:
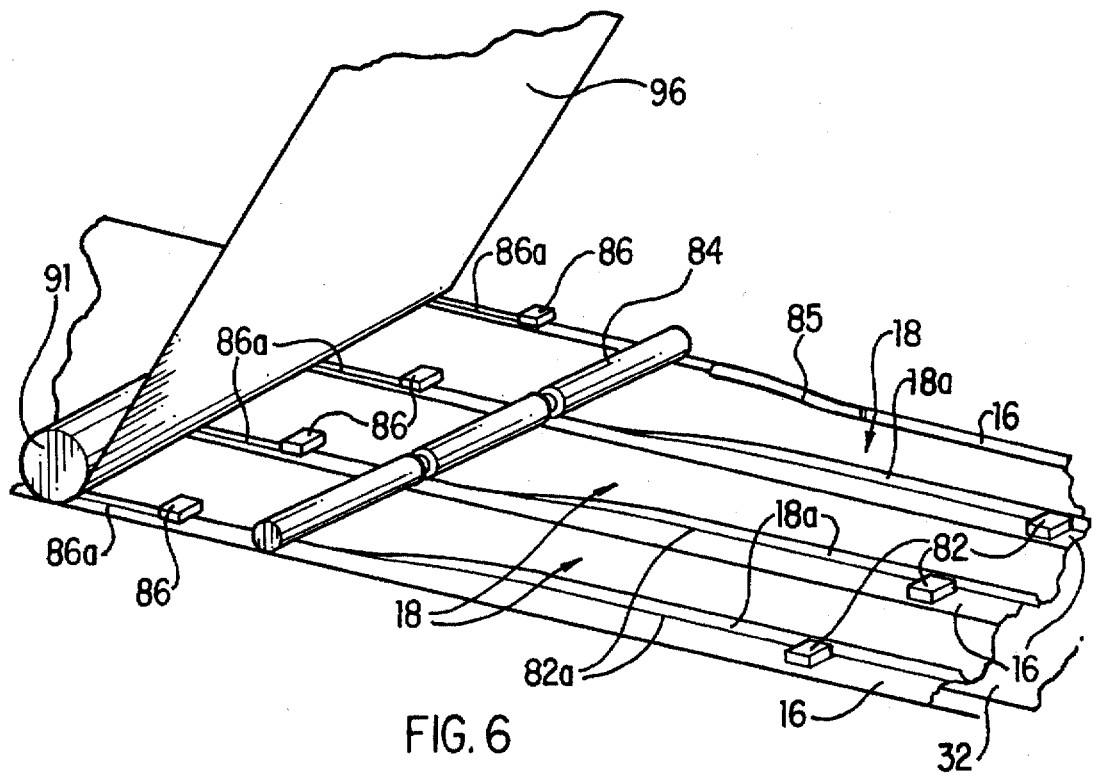
FIG. 6 is a perspective view of the apparatus of FIG. 3, looking further left from the view of FIG. 5.

FIGS. 1 and 2 show an insulating batt 10 of the type produced by the apparatus according to the present invention. FIG. 2 shows batt 10 in its as formed condition. FIG. 1 shows batt 10 in a condition ready for installation, such as across the ceiling of a building, after being inverted end to end from the orientation of FIG. 2.

Batt 10 has overlapping upper and a lower reflective insulating sheets 12,14, which are interconnected by a plurality of parallel, laterally spaced connector strips 16, bonded along each of opposed side margins 16a thereof to a respective one of sheets 12,14. The web portion 16b of each connector strip 16 spaces sheets 12,14 in the condition shown in FIG. 1, and is able to move to that condition from a position in which it extends between sheets 12,14 in the as formed condition of FIG. 2, by provision of longitudinal fold lines 16c. The bracing strips preferably have a length substantially equal to the length of the batt between the opposed ends. While a lesser length of bracing strips is possible, it is highly desirable that their length is a major part, such as at least 85%, of the length of the batt.

Batt 10 also includes a respective partition strip 18 joining successive pairs of strips 16 and having a web portion 18b thereof extending between its strips 16, intermediate of and substantially parallel with sheets 12,14. Each strip 18 is bonded along each of opposed side margins 18a thereof to a respective one of its successive web portions 16b. Strips 18 also have fold lines 18c. In an alternative form, a plurality of partition strips, most preferably two or three, is provided between each set of successive bracing strips. In that alternative, the partition webs between each of successive bracing webs are mutually spaced from each other and from the two sheets, with the partition webs most preferably substantially parallel to the two sheets, when the batt in its operative position. Also in that alternative, with the batt in its operative position, each partition web between each of successive bracing webs preferably is substantially co-planar with a respective partition web between each other set of the successive bracing webs.

The apparatus 20 for forming a batt 10 is shown in FIGS. 3 to 6. In apparatus 20 as shown in FIG. 3, a batt 10 is formed by a sequence of operations proceeding from right to left, and includes first and second feed roll stands 22,24, a processing bed 26, and an output station 27.

Stands 22,24 each have a laterally spaced pair of support posts 22a,24a (of which only the nearside one is shown) which extend upwardly from a base frame 28 on base 29. Posts 22a hold a roll 30 of reflective insulation of a width corresponding to that required for batt 10. Insulation 32, to form sheet 12 of batt 10, is drawn from roll 30 and, after passing under first and second idler rolls 34,36 journalled in and spaced along frame 28, rises over idler roller 38 at the near end of bed 26. From roller 38, insulation 32 passes along bed 26 to station 27.

Posts 24a hold a roll 40 of reflective insulation of similar width to that of roll 30. From roll 40 insulation 42 is drawn under idler rollers 44,46 journalled in and spaced along frame 28, above insulation 32. From roller 46, insulation 42 rises over an idler roller 48 of slitter station 50.

Station 50 has a laterally spaced, upstanding pair of brackets 50a, of which only the nearside one is shown in FIG. 3. Roller 48 is journalled in brackets 50a, as also is a rotatable slitter roller 52 and vertically spaced guide rollers 53. A plurality of annular cutter blades 52a is mounted on and rotatable with roller 52. The blades 52a are uniformly spaced along roll 52, with their number being one less than the number of partition strips required for batt 10. In the illustrated embodiment there are two cutter blades 52a and, in passing from roller 48 to rollers 54, insulation 42 is drawn against blades 52a and slit into three strips 18 of substantially equal width. Each strip 18 passes under a respective roller 53, and then over a roller 54 (FIG. 5) adjacent, but slightly upstream of roller 38. Over bed 26, strips 18 are presented onto insulation 32 and move with the latter to station 27.

In passing onto bed 26, strips 18 are caused to move slightly to one side relative to sheet 32. In the illustrated embodiment, this is to the left of sheet 32 when viewed longitudinally from the end of bed 26 nearer stands 22,24 (i.e. towards the nearside as viewed in FIGS. 3 and 5). Subsequent reference to "left" and "right" is in the context of the illustrated embodiment, although movement of strips 18 could be to the right, if required, with such references then being reversed. Such movement of strips 18 is preferably by means of respective deflector arms located between rollers 53,54. While not shown, such deflector arms may be similar to fingers 56, described later herein with reference to FIG. 5 but, due to the arms not having associated stops, they effect the required lateral movement.

The movement of the three strips 18 to the left is such that the extreme left strip has a major part of its width overlying sheet 32, but with a minor part of that width projecting beyond the left edge of sheet 32. Similarly, a minor part of the width of the middle strip 18 overlaps a minor part of the width of the left strip 18, while the right strip 18 similarly overlaps a minor part of the middle strip 18. As a consequence, a minor part of the width of insulation 32 is exposed beyond the right strip 18.

In an initial stage of progress along bed 26 of insulation 32, and strips 18 thereon, a left side portion 18d of each strip 18 is turned upwardly from, and to expose, insulation 32. This occurs upstream of an insert station 55, and is effected by a respective finger 56 (FIG. 5) depending from a support bar (not shown) which extends laterally above bed 26. To assist with this turning of side portions 18d, strips 18 are held across the right part of their width by a guide member 57 located below fingers 56. Member 57 includes a base plate 58 which extends laterally above insulation 32, but below each strip 18, and guide plates 59 each of which is mounted on plate 58 to the right of a respective strip 18 and extends partly across the width of the latter. Each plate 59 prevents its strip 18 from moving to the right away from its finger 56, and holds substantially flat that part of the width of its strip 18 over which it extends.

Figure 5:
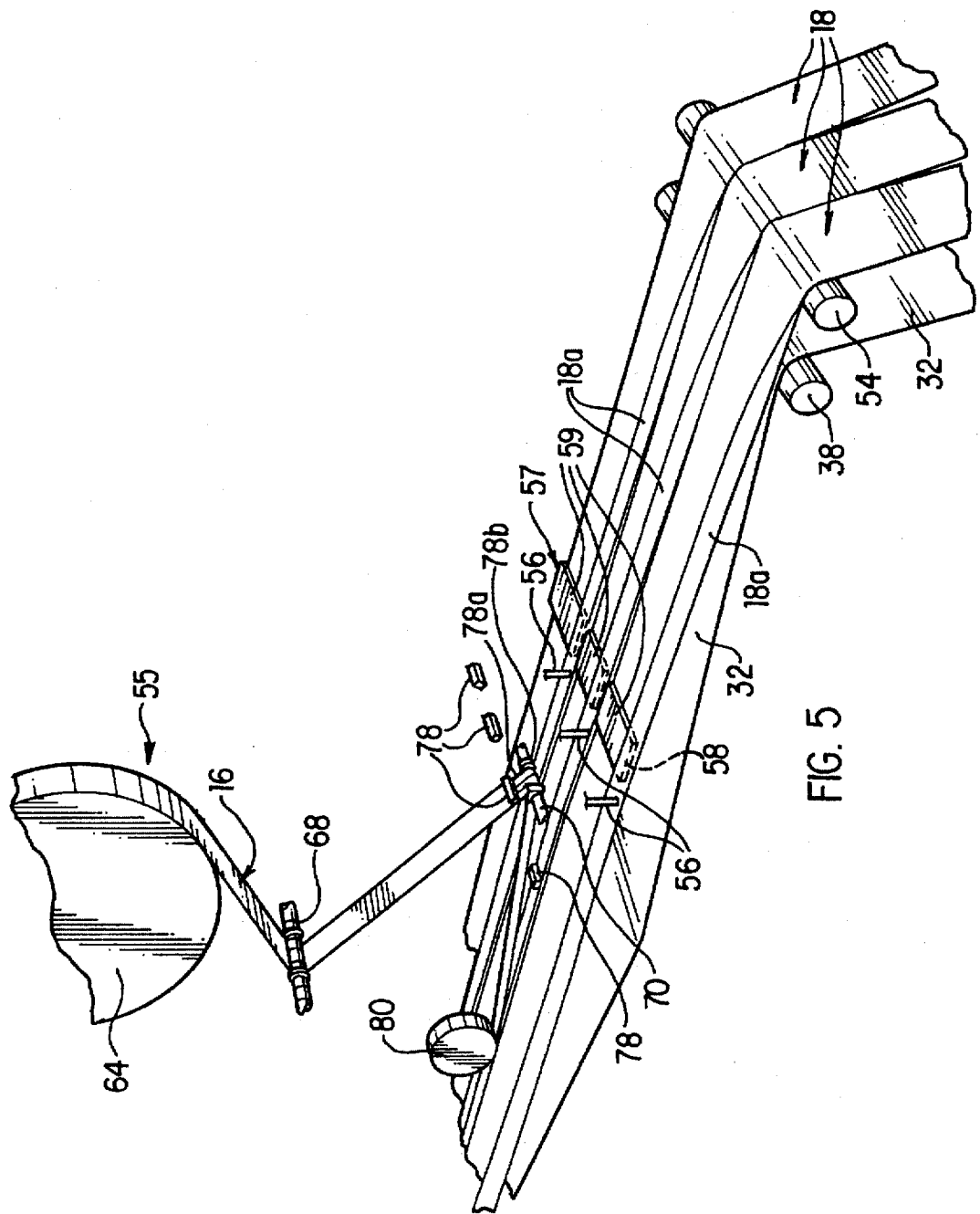
FIG. 5 is a perspective view of the apparatus of FIG. 3, taken to the left of FIG. 4.
Figure 5A:
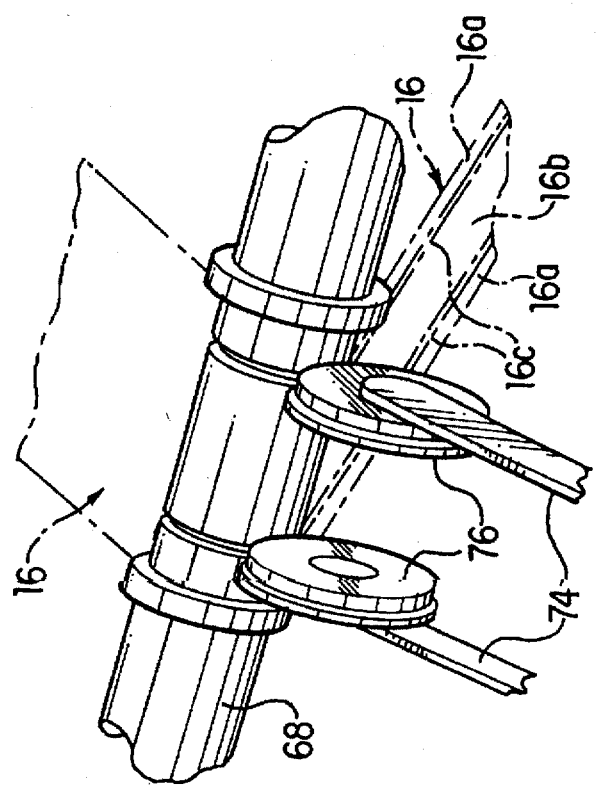
FIG. 5a is a perspective view from the left of FIG. 5, showing enlarged detail.

At insert station 55, apparatus 20 has a laterally spaced pair of frame members (not shown), having a shaft 62 journalled therein. Shaft 62 carries a series of four rolls 64 of strip material, each having a width corresponding to that required for connector strips 16 of batt 10. As shown in FIG. 5, illustrating only one of rolls 64, a respective strip 16 is drawn from each roll 64, around downstream idler roller 68, and then upstream to pass around idler roller 70. To the downstream side of roller 68, there is a shaft 72 shown in FIG. 5A which, for each strip 16, carries a laterally spaced pair of arms 74 each having a creasing roller 76. Each roller 76 engages and creases strip 16 to provide what is to be a respective fold line 16c in strip 16. Thus, in passing from creasing rollers 76, strip 16 can be recognised as having left and right margins 16a, and web 16b therebetween.

The position of each roll 64, and the arrangement of rollers 68,70, is such that its strip 16 is drawn downstream from roller 70 above a respective exposed portion of insulation 32. The extreme right strip 16 is positioned, by the axial location of its roll 64 on shaft 62, such that its right hand margin 16a is centered above the exposed portion of insulation 32 to the right of the right strip 18; the web 16b and left margin 16a of the extreme right strip 16 thus extending above the right strip 18. The second strip 16 from the right has its right margin 16a centered above the portion of insulation 32 exposed by upturned portion 18d of the right strip 18; with its web 16b and left margin 16a above the middle strip 18. The third strip 16 from the right is similarly positioned to the second strip 16, but in relation to the exposed portion of insulation 32 between the middle and left strips 18. The extreme left strip 16 has its right margin centered above the portion of insulation 32 exposed by portion 18d of the left strip 18; with its web 16b and left margin 16a extending above, but beyond, the left edge of insulation 32.

Above roller 70, there is a respective glue applicator head 78, of a first set, for each strip 16. Each head 78 is supported (by means not shown) at a location at which it is operable to apply a glue line 78a to its strip 16 and, for each head 78 other than the extreme left one, to apply a glue line 78b to its strip 16. Each head 78 is above roller 70 and is positioned to apply glue lines 78a,78b to a surface of its strip 16 which, upon the latter passing around roller 70, will face downwardly. Each glue line 78a is applied along the right side margin 16a of its strip 16 so as to contact insulation 32. Each glue line 78b is applied on a medial line of a respective strip 16, other than extreme left strip 16, centrally along the web 16b thereof, so as to contact what is to become the right hand margin 18a of the next strip 18 to the left. Downstream of roller 70, each strip 16 converges towards bed 26 and is pressed onto bed 26 by a respective pressure roller 80 which facilitates bonding by glue lines 78a,78b.

Downstream of rollers 80, there is a second set of glue applicator heads 82, with each head 82 positioned to apply a respective glue line 82a onto the upper surface of each web 16b, other than that of the extreme right strip 16, along the medial line thereof. Further downstream of heads 82 there is in turn a pressure roller or series of roller(s) 84, and thereafter a third set of glue applicator heads 86. Under the action of pressure roller(s) 84, the upturned side portion 18d of each strip 18 is turned down to onto a respective strip 16 to bring what is to become a left side margin 18a of each strip 18 into contact with the respective glue line 82a applied by the heads 82. Roller(s) 84 consolidate resultant bonding by those glue lines applied by heads 82.

As is apparent from FIG. 5, fingers 56 are some distance downstream from roller 54. Despite this, the upturning of side portions 18d produced by fingers 56 tends to commence at roller 54. As indicated, side portions 18d are turned down before roller(s) 84, although the action of fingers 56 can continue a distance downstream of fingers 56. Indeed, that action is required to continue beyond glue applicator heads 82 of the second set. If required, a second set of fingers can be provided downstream of rollers 80 and/or adjacent applicator heads 82 of the second set. Also, if required, inclined guide baffles, intermediate of the applicator heads 82 of the second set and roller(s) 84, can be provided to facilitate turning down of side portions 18d in advance of roller(s) 84.

In advance of roller(s) 84, the left margin 16a of the extreme right strip 16 preferably is folded through 180°, along the adjacent crease line 16c, so that this margin 16a overlies its web portion 16b. This folding is achieved by an elongate baffle 85 which extends along the line of travel of the margin 16a. The baffle is of helical form and has an upstream end onto which the margin 16a is received, with the margin following the helical twist as it advances along the baffle, so as to fold as required. In the arrangement illustrated, it will be appreciated that the baffle as viewed from its upstream end is twisted clockwise from that end to its downstream end. On passing through roller(s) 84, the folded margin 16a is pressed onto its web portion 16b.

After roller(s) 84, each head 86 applies a respective glue line 86a along the upper-most surface of the left side margin 16a of each strip 16. The assembly, comprising insulation 32 and strips 16,18 thereon, then advances below roll 88, mounted on shaft 89 above bed 26 by posts 90, and then through the nip of upper and lower rollers 91,92 of roll stand 93. Roll 88 comprises reflective insulation 94 of a width corresponding to that required for batt 10. Insulation 94 is to form sheet 14 of bat 10, and is drawn from roll 88 and around upper roll 91 of roll stand 93 so as to pass through the nip of rollers 91,92 with the assembly of insulation 32 and strips 16,18. Roll 88 is axially offset to the left, relative to roll 30, such that insulation 94 overlies the left margins 16a of strips 16 in substantially the same relationship as insulation 32 extends under the right margins 16a. Bonding between the left margins 16a and insulation 94, by the glue lines applied on those margins by the heads 86 of the third set, is facilitated by pressure applied by rollers 91,92.

Downstream of stand 93, there is a cutting station 95 to which the assembly, of insulation 32,94 and strips 16,18 therebetween, passes. Station 95 includes a carriage 96, mounted so as to be able to be advanced with the downstream movement of the assembly of insulation 32,94 and strips 16,18, and then retracted. Carriage 96 is so movable under the action of a laterally spaced pair of double acting pneumatic actuators 97, and control means (not shown) for actuators 97. Carriage 96 includes a main body 96a and an upper platen 96b, between which that assembly extends. Body 96a carries a guillotine blade 98 which is vertically movable under the action of a laterally spaced pair of double acting pneumatic actuators 99, and the control means; with blade 98 being co-operable with the downstream end of platen 96b for cutting the assembly into required standard lengths. Carriage 96 is advanced by actuators 97 to attain the speed of the assembly when a required length of the latter has passed the downstream end of platen 96b, at which time the assembly is cut by blade 98, by operation of actuators 99. Actuators 97 then retract carriage 96, and the cycle is repeated. Cut lengths of the assembly are received in output station 27 for packaging.

Movement of insulation 32 through apparatus 20, from stand 22 to station 27 is provided by drive to driven roller 93a of roll stand 93. For this, roller 93a is driven by a motor (not shown) to impart rotation to roller 92, with roller 92 drawing the assembly, of insulation 32,94 and strips 16,18, through the nip of rollers 91,92 and causing rotation of roller 91. Alternatively, rollers 91,92 may be coupled by a gear system for opposite rotation in unison, with rotation of roller 93a. Thus, roll stand 93 provides the drive means for apparatus 20, while drawing of insulation 32 from roll 30 is facilitated by roller 38 and similar laterally extending rollers (not shown) which are located downstream of roller 38 and provide an upper support surface of bed 26. However, other arrangements are possible.

The cut lengths received at station 27 comprise batts 10 in the condition shown in FIG. 2. With reference to FIG. 2, batt 10 can be adjusted to the condition shown in FIG. 1 by gripping the left hand side of sheet 12 and the right side of sheet 14 and pulling sheets 12,14 in the directions of arrows 12a,14a. The sheets preferably are pulled until they are in the opposite relationship to that shown in FIG. 2, i.e. with sheet 12 projecting beyond the left side of sheet 14, and sheet 14 to the right of sheet 12. The batt then is manually smoothed, to fully form crease lines 18c in partition strips 18. Sheets 12,14 then are pulled in the opposite direction to arrows 12a,14a, such that the batt assumes the condition shown in FIG. 1. Batt 10 is stable in the condition of FIG. 1, with webs 18b retaining sheets 12,14 in a required overlapping, but spaced relationship.

Sheets 12,14 preferably are of Kraft paper, having a metal foil over at least one of its major surfaces to provide reflective insulation. Sheet 12 preferably has metal foil, such as alumiminium foil over each of those surfaces; with it being sufficient if sheet 14 has foil on only one surface, preferably its lower surface. Partition strips preferably are similar to sheet 14, whereas strips 16 preferably are similar to sheet 12. In general, it is desirable that strips 16 have foil on each surface, for increased stiffness and, hence, ability to retain the FIG. 1 condition. The two sheets, and at least the partition strips of the connecting means, are formed of a heat reflective insulating material. These may, for example, comprise at least one layer of paper, preferably coated or impregnated with a bituminous or fire resistant material, and having a reflective metal film or foil over at least one surface thereof. Such material having such film or foil over only one surface is sufficient, although it is preferred to have at least one of the two sheets provided with a reflective metal film or foil over each of its surfaces.

As will be appreciated, strips 16,18 define a plurality of open ended air-pockets 19 between sheets 12,14. These air-pockets 19 and the reflective foil on strips 18 substantially enhance the thermal insulating effect of batt 10, compared with a batt simply comprising sheets 12,14 and strips 16. The partition strips extend in substantially parallel relationship to the bracing strips and preferably having a length substantially equal to the length of the bracing strips between the opposed ends of the batt.

Apparatus 20 readily can be adapted to provide batts which are a variant of batt 10, but having two or more strips 18 between each pair of successive strips 16 and which, in the FIG. 1 condition, are mutually spaced vertically between sheets 12,14. Such variant provides further enhanced insulation and apparatus 20 readily can be adapted to produce these, or batts 10, as required. As will be appreciated, production of the variant necessitates strips 16 of greater width across their webs 16b, and introduction of at least one additional set of strips 18.

Figure 7:
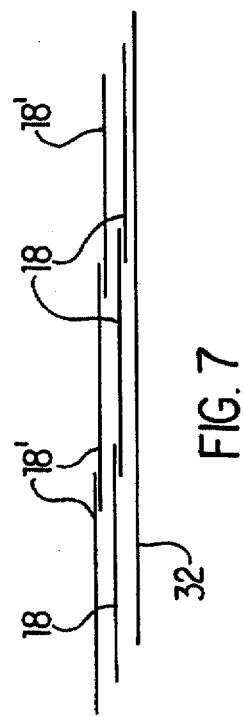
FIG. 7 shows detail illustrating use of the apparatus of FIGS. 3 to 6 in producing a variant of the batt of FIGS. 1 and 2.

Where, for example, it is required to provide a variant of batt 10, having two mutually spaced strips 18 between successive strips 16, a second stand 24 with roll 30 is provided at the upstream end of apparatus 20. Insulation drawn from the second roll 30 is similarly drawn under second idler rollers 44,46 and slit by blades 52a of a second roller 52 of station 50, and then passed via the same or a second set of rollers 53 and onto bed 26 via roller 54. FIG. 7 shows schematically how the strips 18' produced from the insulation of the second roll are positioned relative to the strips 18 derived from the roll 30.

As shown in FIG. 7, the strips 18' initially overlap each other in the same way as described for strips 18 of FIGS. 3 to 6. However, strips 18', as a set, are offset to the left in the same direction relative to the set comprising strips 18 as the latter are from insulation 32. Downstream of rollers 38,54, fingers 56 are operable to turn up a left hand side portion 18a of a respective strip 18, as previously described, and similarly turn up a left side portion of the corresponding one of strips 18'. Strips 16 then are inserted, as previously described. Each glue applicator head 78 of the first set in again providing a glue line 78a on the right side margin 16a of each strip 16. However, heads 78 also operate to provide two glue lines 78b for each strip 16 other than the extreme left strip 16, with each glue line 78b at about one-third of the way across web 16b of its strip 16 from a respective fold line 16c, to provide bonding to what is to become a right side margin of respective pairs of strips 18,18'. Similarly, each applicator head 82 is operable to provide two glue lines, at such one third intervals, on the upper surface of each strip 16 other than the extreme right strip 16, to provide bonding for what is to become the left side margins of respective pairs of strips 18,18'. The heads 86 of the third set operate as previously described, as do other components of apparatus 20.

In the form shown in FIGS. 2 and 2, webs 16b typically are from 25 to 35 mm in width, with strips 18 located so as to extend substantially centrally between sheets 12,14 with batt 10 in the condition of FIG. 1. With a batt in accordance with the variant described herein, webs 16b can range from 45 to 55 mm in width where two strips 18 are provided between successive strips 16, with strips 18' preferably substantially uniformly spaced between sheets 12,14 in the FIG. 1 condition. A greater width of wed 16b is preferred where more than two strips 18' are provided. Margins 16a,18a (and 18a where relevant) most conveniently range from about 10 to 15 mm in width, the principal requirement, of course, being that the margins are strongly bonded respectively to sheets 12,14 and to webs 16b.

In the arrangement described, batt 10 in its FIG. 1 condition has its right hand strip 16 of C-shaped cross-section, whereas the other strips are of Z-shaped cross-section. However, it is possible for all strips 16 to be of C- or Z-shaped cross-section, as will be apparent from the description. It is preferred that at least one strip 16 be of different cross-section to the others, as this can increase the stability of the batt in its FIG. 1 condition. However, it also is preferred that the each outer edge of upper-most sheet 12 is strengthened by having a respective margin 16a bond thereto.

In the arrangement described, each strip 18, with batt 10 in its FIG. 1 condition, has one margin 18a projecting above, and the other projecting below, its web 18b. However, this also can be changed so that each margin 18a projects above, or below, the web 18b, as a consequence of use of baffles similar to baffles 85.

Batts 10 readily are able to be mass produced in apparatus 20 in convenient sizes, such as with sheets 12,14 up to 1200 mm long and from 450 to 600 mm wide. Variation in required length can be adjusted by variation in operation by cutting station 95. The lateral extent of apparatus 20 readily is able to accommodate insulation 32,94 of different widths, while the number and lateral spacing of blades 52a, fingers 56, glue heads 78,82,84,86, rollers 80,86, and the like can be readily adjustable.

Figure 8:
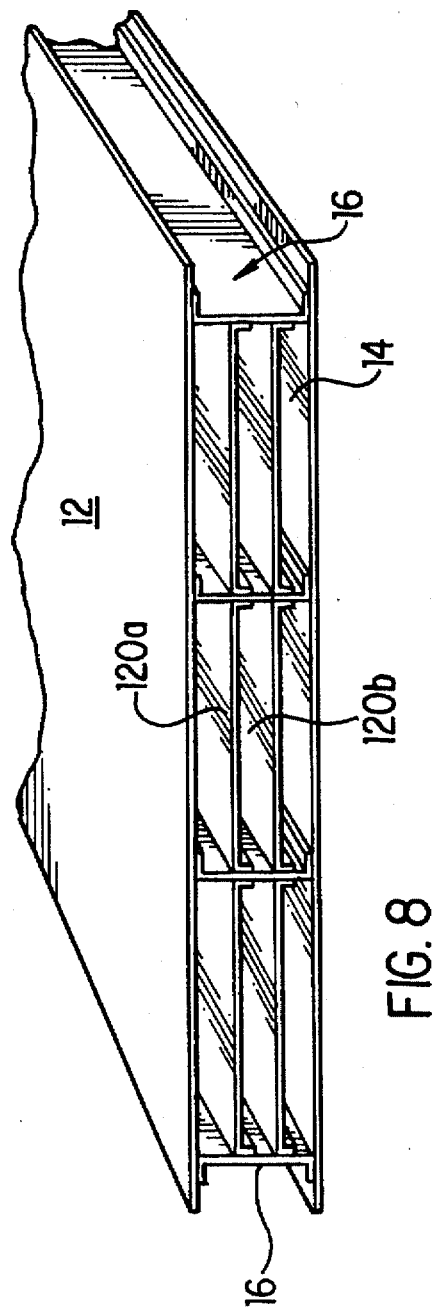
FIG. 8 shows another embodiment of the invention with three chambers.
Figure 10:
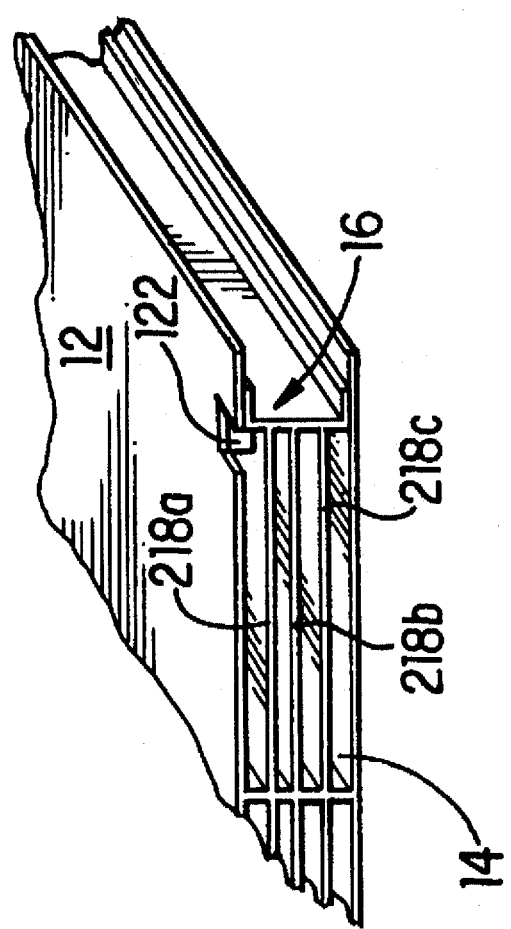
FIG. 10 shows another embodiment of the invention with four chambers and a tab stiffener.

FIGS. 8 and 10 illustrate embodiments of the invention when additional insulation is furnished by the use of additional web pieces 120a and 120b (FIG. 8) and 218a, 218b and 218c (FIG. 10).

Figure 9:
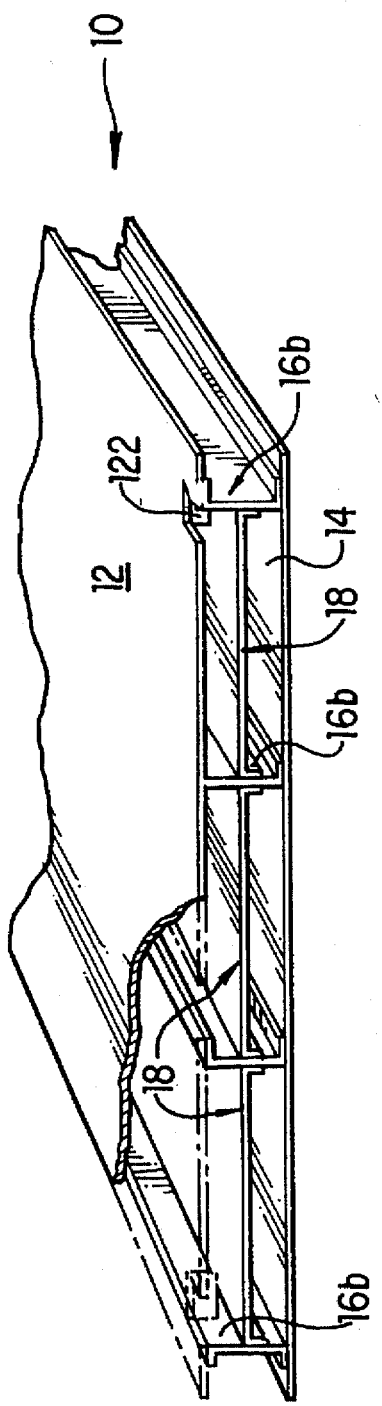
FIG. 9 shows still another embodiment of the invention with a Tab 122 for stiffening.

Batts produced by the apparatus and method of the present invention are found to be self-supporting when in the position of FIG. 1. However, if required, at least one tab 122 as shown in FIG. 9 can be turned from at least one of sheets 12,14, so as to abut against an adjacent web 16b, to provide a locking action. Thus, by providing a short cut in sheet 12 adjacent a web 16b, inwardly of one end of sheet 12, and a parallel further cut a short distance away from the web 16b, a tab 122 is defined between the cuts can be turned so as to locate against the web 16b to lock batt 10 in its operative position.

The batts are well suited for in-ceiling insulation. In such application, they typically are laid across, rather than between, ceiling joists. However, the baits also can be used in other applications, such as in cavity walls, between studs and facing sheets, with sheets 12,14 substantially vertical.

The batts provide significantly improved thermal insulation relative to a two-sheet batt of said Australian patent specification 511833 made of similar sheet materials. Thus, for batts having an upper sheet having foil on each surface and a lower sheet having foil on only one surface, the batt of specification 511833 can exhibit R values of 4.1 in summer and 1.4 in winter. Again, using such upper and lower layers, a batt 10 as in FIG. 1 can achieve R values of 5.5 in summer and 2.7 in winter. Corresponding values, for a batt having two mutually spaced layers of partition strips 18, are 6.8 and 3.5. The R value is an internationally accepted measure of thermal resistance, with higher values indicating greater thermal efficiency.

Finally, it is to be understood that various alterations, modifications and/or additions may be introduced into the constructions and arrangements of parts previously described without departing from the spirit or ambit of the invention.

The claims defining the invention are as follows:

1. An insulating batt comprising two sheets of heat reflective insulating material, and connecting means provided between said sheets and connecting said sheets together in an overlapping, substantially parallel relationship; said connecting means enabling said batt to be adjusted between a collapsed position in which said sheets are closely adjacent, and an operative position in which said sheets are spaced from each other by said connecting means; wherein, said connecting means comprises:

(a) a plurality of substantially parallel, mutually spaced bracing strips extending between and connected to each of said sheets, each bracing strip having two substantially parallel longitudinal fold lines such that a bracing web is defined between said lines and a respective side margin extends from the bracing web beyond each fold line, each bracing strips having a respective side margin secured to each of said sheets such that the bracing web is substantially normal to and defines the spacing between the sheets when said batt is in its operative position and such that, on movement of the batt to its collapsed position, the bracing webs are substantially parallel to the sheets; and (b) a plurality of partition strips of heat reflective insulating material, each of which extends longitudinally between the webs of successive bracing strips, each partition strip being folded along two substantially parallel fold lines such that a central partition web is defined between said fold lines and a respective side flange extends from the partition web beyond each of its fold lines, each partition strips having a respective side flange secured to each of the webs of said successive bracing strips, the width of the partition web substantially corresponding to the spacing between said successive bracing strips when said batt is in its operative position such that, on movement of the batt from its collapsed position to its operative position, each partition web is spaced from each of the sheets.

2. The batt of claim 1, wherein said batt has a rectangular shape, and wherein the bracing strips are substantially uniformly spaced across the width of the batt.

3. The batt of claim 2, wherein the bracing strips have a length which is a major part of the length of the batt, such as at least 85% of the length of the batt.

4. The batt of claim 2, wherein the bracing strips have a length substantially equal to the length of the batt.

5. The batt of claim 1, wherein the partition strips have a length substantially equal to the length of the bracing strips.

6. The batt of claim 1, wherein the partition web of each partition strip is substantially parallel to the two sheets when said batt is in its operative position.

7. The batt of claim 1, wherein at least some of the partition webs are inclined with respect to the two sheets when said batt is in its operative position.

8. The batt of claim 1, wherein a single partition strip is provided between said webs of said successive bracing strips.

9. The batt of claim 1, wherein a plurality of partition strips is provided between said webs of said successive bracing strips, said plurality of partition strips being mutually spaced from one another and from said two sheets when said batt is in its operative position.

10. The batt of claim 9, wherein two partition strips are provided between said webs of said successive bracing strips.

11. The batt of claim 9, wherein three partition strips are provided between said webs of said successive bracing strips.

12. The batt of claim 1, wherein each partition web between each of the successive bracing webs is substantially co-planar with a respective partition web between each other set of the successive bracing webs, when said batt is in said operative position.

13. The batt of claim 1, wherein said heat reflective, insulating material comprises at least one layer of paper having a reflective metal film or foil over at least one surface thereof.

14. The batt of claim 13, wherein said at least one layer of paper is coated or impregnated with a bituminous or fire resistance material.

15. The batt of claim 13, wherein at least one of said two sheets is provided with said reflective metal film or foil over each surface thereof.

16. The batt of claim 1, wherein said bracing webs are of said heat reflective, insulating material.

17. The batt of claim 1, wherein at least one of said bracing strips and said partition strips has a C-shaped cross-section when said batt is in its operative position.

18. The batt of claim 1, wherein at least one of said bracing strips and said partition strips has a Z-shaped cross-section when said batt is in its operative position.

19. The batt of claim 1, wherein securement of said bracing strips to said two sheets and to said partition strips is by means of adhesive bonding therebetween.

20. The batt of claim 1, wherein at least one of said sheets is provided with at least one locking tab for locking said batt in its operative position.

21. The batt of claim 1, wherein the web of each partition strip is substantially parallel to the two sheets when said batt is in its operative position.

* * * * *